(12) United States Patent  
Koop

(10) Patent No.: US 9,194,752 B2  
(45) Date of Patent: Nov. 24, 2015

(54) IR SENSOR SYSTEM, IR SENSOR MODULE, TEMPERATURE DETECTION MODULE AND CORRESPONDING CALIBRATION METHOD

(71) Applicant: Robert Bosch GmbH, Stuttgart (DE)

(72) Inventor: Paul Koop, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/657,578

(22) Filed: Mar. 13, 2015

(65) Prior Publication Data

US 2015/0260582 A1    Sep. 17, 2015

(30) Foreign Application Priority Data

Mar. 13, 2014   (DE) .......................... 10 2014 204 634

(51) Int. Cl.  
*G01J 5/10*   (2006.01)  
*G01J 5/00*   (2006.01)

(52) U.S. Cl.  
CPC ............ *G01J 5/10* (2013.01); *G01J 2005/0048* (2013.01); *G01J 2005/0077* (2013.01); *G01J 2005/106* (2013.01)

(58) Field of Classification Search  
CPC ................. G01J 2005/0048; G01J 2005/0077; G01J 2005/106; G01J 5/10  
See application file for complete search history.

(56) References Cited

U.S. PATENT DOCUMENTS

| | | | |
|---|---|---|---|
| 9,066,072 B2* | 6/2015 | Bai et al. | |
| 2006/0124831 A1* | 6/2006 | Schimert et al. | 250/214 R |
| 2007/0170359 A1* | 7/2007 | Syllaios et al. | 250/338.1 |
| 2012/0031452 A1* | 2/2012 | Sjolund | 136/222 |
| 2015/0009335 A1* | 1/2015 | Strandemar | 348/164 |

* cited by examiner

Primary Examiner — Mark R Gaworecki  
(74) Attorney, Agent, or Firm — Kenyon & Kenyon LLP

(57) ABSTRACT

An IR sensor system, an IR sensor module, a temperature detection module and a corresponding calibration method are provided. The IR sensor system has an IR sensor module including a pixelated IR detection area, which has a first control unit for controlling an IR measuring operation and a calibration operation, and a storage unit connected to it, and including a temperature detection module which is detectable in a pixel subarea of the IR detection area, the temperature detection module having a temperature sensor device and a second control unit connected to it. The geometric position of the pixel subarea on the IR detection area is storable in the storage unit.

12 Claims, 5 Drawing Sheets

IR SENSOR SYSTEM, IR SENSOR MODULE, TEMPERATURE DETECTION MODULE AND CORRESPONDING CALIBRATION METHOD

FIELD OF THE INVENTION

The present invention relates to an IR sensor system, an IR sensor module, a temperature detection module and a corresponding calibration method.

BACKGROUND INFORMATION

Infrared (IR) sensor systems including pixelated IR detection areas, also referred to as focal plane arrays (FPA), are used for detecting the temperature distribution on surfaces and objects contactlessly. For this purpose, they are integrated into infrared cameras, for example, thermographic cameras or surveillance cameras.

These IR sensor systems are used in a plurality of applications. Among other things, they may be used in a sensor cluster. Such sensor clusters are generally made up of a plurality of modules which are equipped with different sensors and configurations. Such sensor modules are generally connected wirelessly. The signals are used as input variables for the control or monitoring of a room in which the system is used. Of importance in such sensor modules are the overall size and the power consumption.

The individual pixels of these infrared sensor devices typically show drift over time in offset and sensitivity. For this reason, it is necessary to carry out a recalibration on a regular basis during operation. Typically, shutters are integrated into the infrared cameras for this purpose. In these calibration methods, a metal surface of a homogeneous temperature is introduced into the beam path and the signals of all pixels are subsequently recalibrated.

The known shutters entail hardware costs for the shutter dial as well as the electric motor, higher power consumption, assembly and adjustment costs. Furthermore, they result in a relevant increase in the installation space of the sensor modules. Moreover, the mechanically movable shutter components result in a reliability risk. In addition, interfering sounds may be caused by the shutter movement during the calibration.

SUMMARY

The present invention provides an IR sensor system, a related calibration method, an IR sensor module, and a temperature detection module.

The idea underlying the present invention is to communicate a calibration based on a reference temperature of a pixel subarea which is communicable to the IR sensor module, starting from a temperature detection module, which is detectable in the pixel subarea.

According to a preferred specific embodiment, the first control unit is designed for carrying out the communication link and the calibration operation in a time-controlled and/or event-controlled manner. This is advantageous, since no continuous communication is necessary, but instead only in certain aging cycles.

According to another preferred specific embodiment, the geometric position of the pixel subarea on the IR detection area may be externally input into the storage unit. This advantageously occurs during initial commissioning.

According to another preferred specific embodiment, the temperature detection module is heatable. This makes it possible to use different temperatures for the calibration.

According to another preferred specific embodiment, at least two temperature detection modules are provided, of which one temperature detection module is heatable in a heating operation. This contributes to increasing the accuracy.

According to another preferred specific embodiment, the first control unit is designed for initiating the heating operation of the temperature detection module in the communication link. Thus, the heating may be only time-controlled or event-controlled.

According to another preferred specific embodiment, the IR sensor module and the one or multiple temperature detection modules are linked in a wireless network. This increases the flexibility.

According to another preferred specific embodiment, the first control unit (ST) is designed for initiating the heating operation of the temperature detection module in the communication link in a temperature-modulated manner and, based on the communicated modulated temperature, to determine the geometric position of the pixel subarea on the IRA detection area and to store it in the storage unit. This eliminates the need for an input procedure.

BRIEF DESCRIPTION OF THE DRAWINGS

FIG. 1a shows the spatial positioning of two modules A, B, FIG. 1b shows module A and FIG. 1c shows module B.

FIG. 2a shows the spatial positioning of three modules A, B, C, and FIG. 2b shows additional Module C.

DETAILED DESCRIPTION

Identical reference symbols in the figures denote identical elements or elements having an identical function.

Figure 1A:
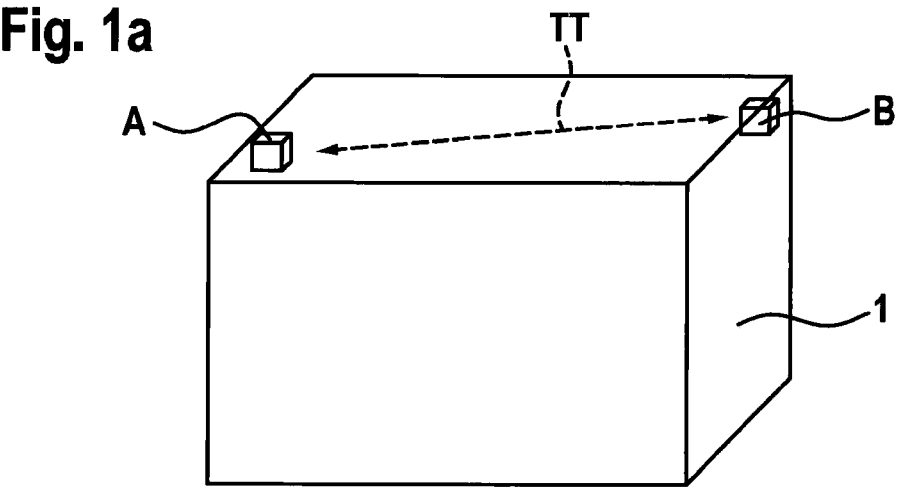
FIGS. 1a through 1c show schematic representations for elucidating an IR sensor system according to a first specific embodiment of the present invention, and specifically
Figure 1B:
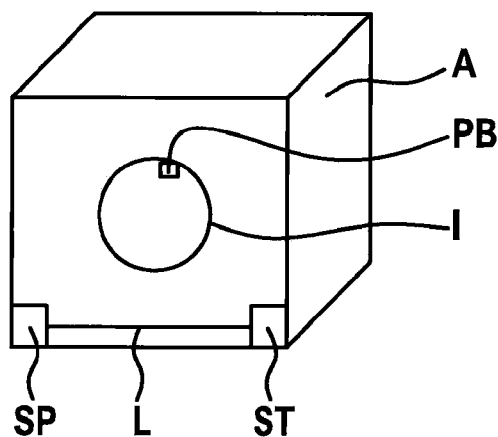
Figure 1C:
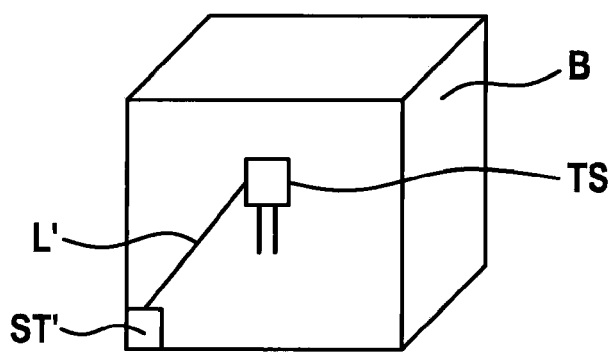

FIGS. 1a through 1c show schematic representations for elucidating an IR sensor system according to a first specific embodiment of the present invention, and specifically FIG. 1a shows the spatial positioning of two modules A, B, FIG. 1b shows module A and FIG. 1c shows module B.

In FIG. 1a, reference numeral 1 denotes a room to be monitored, for example, a living room or a production hall.

Reference symbol A denotes an IR sensor module having a pixelated IR detection area I, a temperature detection module B being situated in its detection area.

With further reference to FIG. 1b, IR sensor module A includes a first control unit ST, which is connected to a storage unit SP via a line L. First control unit ST is used for controlling an IR measuring operation and a calibration operation of IR sensor module A.

A geometric position of pixel subarea PB on IR detection area I, on which temperature detection module B is depicted, is stored in storage unit SP. This may occur via an appropriate externally input via appropriate programming during the installation. Alternatively, the assignment may be carried out automatically using appropriate control methods, as will be explained later. In this connection, it should be noted that pixel subarea PB only has to be very small, since it is assumed that all pixels of IR detection area I are subject to the same aging process. Consequently, one pixel or a few pixels is/are adequate.

Temperature detection module B has a temperature sensor device TS and a second control unit ST' which is connected to it via a line L', the second control unit controlling the temperature detection operation and being able to transmit a detected temperature to IR sensor module A.

First control unit ST and second control unit ST' are designed for establishing a communication link via a first communication link TT, for example, via a wireless network. The transmission may occur via a node in the network or directly from temperature detection module B to IR sensor module A.

During the communication link, a temperature detected by temperature sensor device TS, in particular a surface temperature of temperature detection module B, is communicated to first control unit ST. First control unit ST is designed for controlling a calibration operation of IR sensor module A on a regular basis, based on the communicated temperature and the geometric position of pixel subarea PB on IR detection area I stored in storage unit SP.

Preferably, two temperatures are transmitted to IR sensor module A. In the example of monitoring a living room, a daytime value and a nighttime value may preferably be transmitted in order to generate maximum travel. Based on these temperature values, IR sensor module A may calibrate or recalibrate IR sensor module A, since both the temperature values of the surface of temperature detection module B and the corresponding absolute temperature values of the temperature sensor of the surface of temperature detection module B are present. The software of first control unit ST may assign these values corresponding to the values which are detected for the surface of temperature detection module B in the infrared chip of IR sensor module A. This makes it possible to compensate for long-term drifts of IR sensor module A.

Figure 2A:
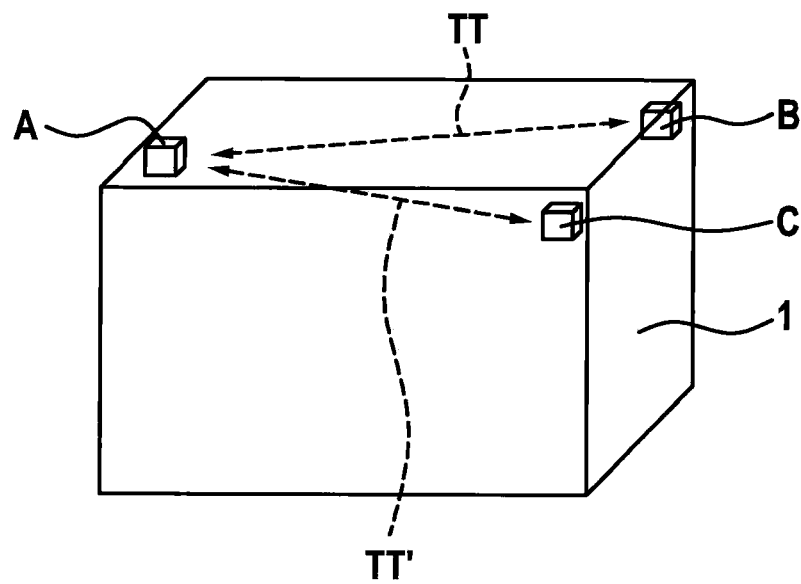
FIGS. 2a through 2b show schematic representations for elucidating an IR sensor system according to a second specific embodiment of the present invention, and specifically
Figure 2B:
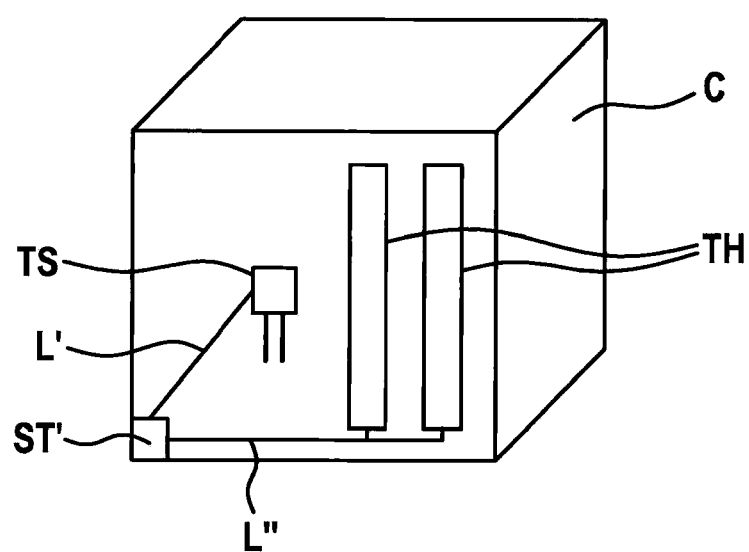

FIGS. 2a through 2b show schematic representations for elucidating an IR sensor system according to a second specific embodiment of the present invention, and specifically FIG. 1a shows the spatial positioning of three modules A, B, C, and FIG. 2b shows additional module C.

In the second specific embodiment according to FIG. 2a, 2b, an additional temperature detection module C is provided, which has a controllable heating device in the form of two heating strips TH, which are coupled to second control unit ST' via a line L". Preferably, temperature detection modules B, C have different temperatures due to the heating, so that the calibration or recalibration may be carried out directly. In this case, the geometric position of pixel subarea PB may be the geometric position of heating strips TH.

The communication link between modules A and C is denoted by reference symbol TT' and is analogous to communication link TT between modules A and B.

Figure 3:
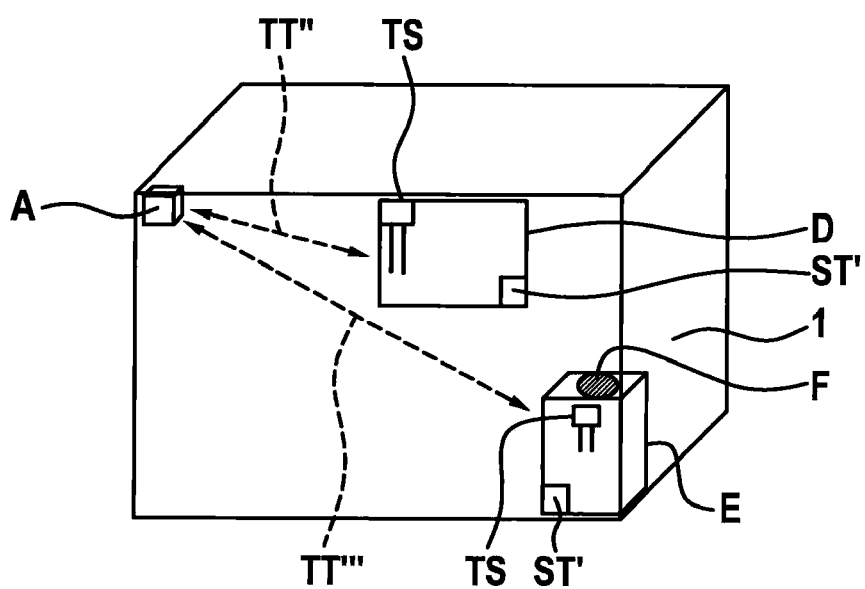
FIG. 3 shows a schematic representation of the spatial positioning of three modules A, D, E for elucidating an IR sensor system according to a third specific embodiment of the present invention.

FIG. 3 shows a schematic representation of the spatial positioning of three modules A, D, E for elucidating an IR sensor system according to a third specific embodiment of the present invention.

In the third specific embodiment, temperature detection modules D, E are provided, temperature detection module D being, for example, a flat screen of a television including a temperature sensor TS. Temperature detection module E is a kitchen range including a corresponding heatable cooking surface F, the temperature of which is detectable via temperature sensor TS.

The communication link between modules A and D is denoted by reference symbol TT". The communication link between modules A and E is denoted by reference symbol TT"'.

The function of the temperature transmission to IR sensor module A occurs in a manner similar to that described above with respect to module B.

Figure 4:
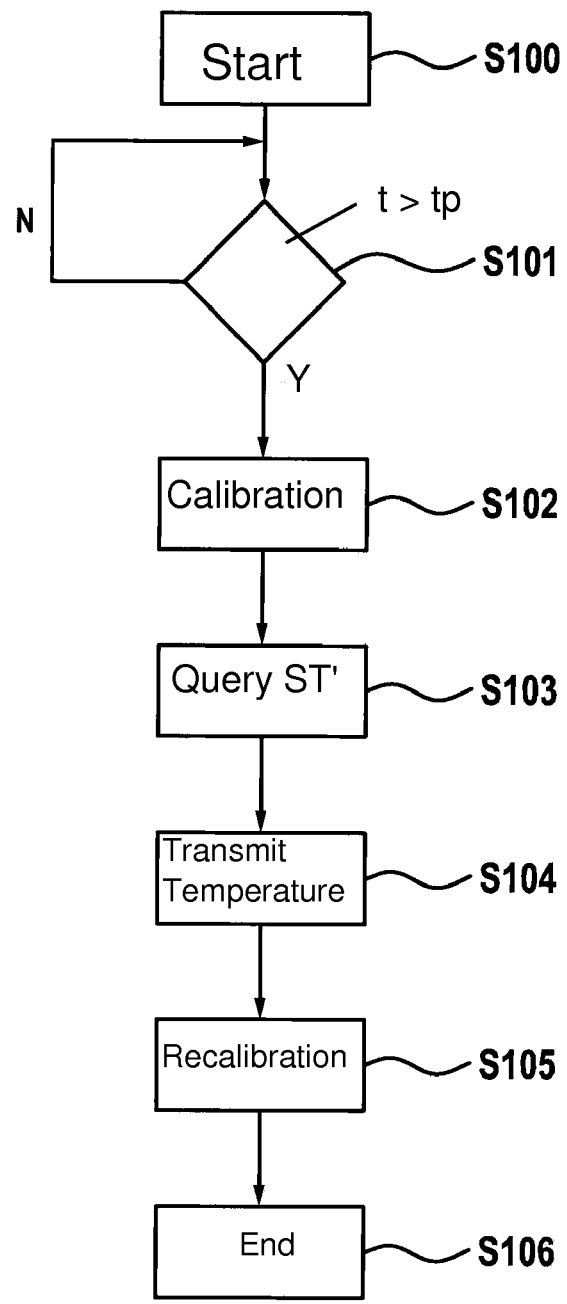
FIG. 4 shows a flow chart for elucidating a calibration method of an IR sensor system according to a fourth specific embodiment of the present invention.

FIG. 4 shows a flow chart for elucidating a calibration method of an IR sensor system according to a fourth specific embodiment of the present invention.

The calibration method, which is time-controlled in this example, starts in step S100. In step S101, it is checked if time t elapsed since the last calibration is greater than a predetermined time $t_P$. If this is not the case, the program steps back. If predetermined time $t_P$ has been exceeded, the program advances to step S102 and begins the calibration operation.

In step S103, first control unit ST queries second control unit ST' via communication link TT with respect to the instantaneously detected temperature of module B; C, D and E.

If necessary, a heating operation of temperature detection module C, D or E is initiated via communication link TT', TT", or TT"'. Control unit ST' of temperature detection module B, C, D and E then transmits the temperature detected by temperature sensor device TS to first control unit ST in step S104. Based on this and based on the stored geometric position of the pixel subarea, the first control unit carries out the recalibration in step S105. The calibration method ends in step S106.

Figure 5:
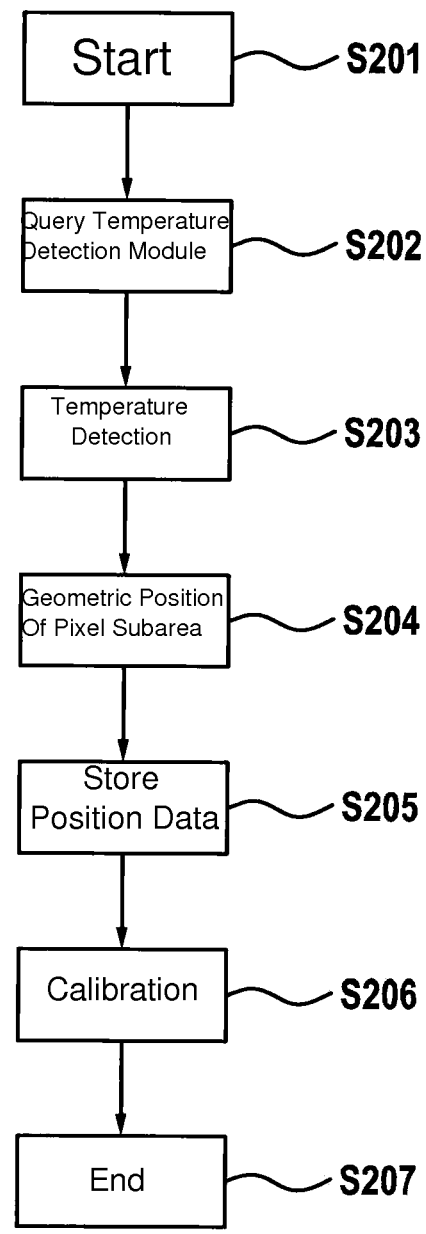
FIG. 5 shows a flow chart for elucidating a calibration method of an IR sensor system according to a fifth specific embodiment of the present invention.

FIG. 5 shows a flow chart for elucidating a calibration method of an IR sensor system according to a fifth specific embodiment of the present invention.

In the above-described second specific embodiment, it is in particular possible to initiate the heating of heating strips TH by control unit ST' in a temperature-modulated manner, and, based on the communicated modulated temperature, to determine the geometric position of pixel subarea PB on IR detection area I and to store it in storage unit SP. This eliminates the need for an external manual input, as described below.

According to FIG. 5, the calibration routine starts in step S201. In step S202, the first control unit sends a query to temperature detection module C via communication link TT. In response to this, a temperature-modulated heating operation of the heating strips is carried out.

A temperature detection on infrared detection area I of IR sensor module A takes place in step S203, and based on the temperature modulation of pixel subarea PB, the geometric position of pixel subarea PB on IR detection area I is established in step S204 and is subsequently stored in storage unit SP in step S205.

In step S206, the actual calibration operation starts, in which the two different heating temperatures, which are the basis for the calibration, are transferred from module C to module A.

The calibration method is ended in step S207.

Although the present invention has been described with reference to preferred exemplary embodiments, it is not limited thereto. In particular, the above-named topologies are only exemplary and not limited to the explained examples.

The objects or the modules for transferring the reference temperature are not limited to the limited examples.

In particular, any type of temperature-generating objects or components, for example, IR diodes, may be used for generating the reference temperatures for the calibration.

Although not shown, for example, temperature values may also be ascertained, which lie below the temperature of room 1 to be monitored, for example, a temperature of an open refrigerator.

What is claimed is:

1. An IR sensor system including:
    an IR sensor module having a pixelated IR detection area which has a first control unit for controlling an IR measuring operation and a calibration operation, and a storage unit connected to the first control unit; and
    a temperature detection module included in a pixel subarea of the IR detection area, the temperature detection module having a temperature sensor device and a second control unit connected to the temperature detection module, wherein:
        a geometric position of the pixel subarea on the IR detection area is storable in the storage unit,
        the first control unit and the second control unit establish a communication link via a first communication link, in which a temperature of the temperature detection module detected by the temperature sensor device is communicable to the first control unit, and
        the first control unit controls a calibration operation of the IR sensor module based on the communicated temperature and the stored geometric position of the pixel subarea on the IR detection area.

2. The IR sensor system as recited in claim 1, wherein the first control unit carries out the first communication link and the calibration operation in at least one of a time-controlled manner and an event-controlled manner.

3. The IR sensor system as recited in claim 1, wherein the geometric position of the pixel subarea on the IR detection area is externally input into the storage unit.

4. The IR sensor system as recited in claim 1, wherein the temperature detection module is heatable in a heating operation.

5. The IR sensor system as recited in claim 4, wherein the first control unit initiates the heating operation of the temperature detection module in the first communication link.

6. The IR sensor system as recited in claim 5, wherein the first control unit initiates the heating operation of the temperature detection module in the first communication link in a temperature-modulated manner and, based on the communicated modulated temperature, to determine the geometric position of the pixel subarea on the IR detection area and to store the geometric position in the storage unit.

7. The IR sensor system as recited in claim 1, further comprising a second temperature detection module, wherein one of the two temperature detection modules is heatable in a heating operation.

8. The IR sensor system as recited in claim 1, wherein the IR sensor module and the temperature detection module are linked in a wireless network.

9. An IR sensor module to be used in an IR sensor system as recited in claim 1.

10. A temperature detection module to be used in an IR sensor system as recited in claim 1.

11. A calibration method for an IR sensor system having an IR sensor module including a pixelated IR detection area, which has a first control unit for controlling an IR measuring operation and a calibration operation, and a storage unit connected to the first control unit, and including a temperature detection module which is detectable in a pixel subarea of the IR detection area, the temperature detection module having a temperature sensor device and a second control unit connected to the temperature sensor device, a geometric position of the pixel subarea on the IR detection area being storable in the storage unit, the method comprising:
    establishing a communication link between the first control unit and the second control unit, in which a temperature of the temperature detection module detected by the temperature sensor device is communicated to the first control unit; and
    controlling a calibration operation of the IR sensor module by the first control unit based on the communicated temperature and the stored geometric position of the pixel subarea on the IR detection area.

12. The calibration method as recited in claim 11, wherein the communication link and the calibration operation are carried out in at least one of a time-controlled manner and an event-controlled manner.

* * * * *